United States Patent

Osaki

[11] Patent Number: 6,148,216
[45] Date of Patent: Nov. 14, 2000

[54] SYSTEM AND METHOD FOR WIRELESS COMMUNICATIONS

[75] Inventor: Yoshiharu Osaki, Yokohama, Japan

[73] Assignee: Matsushita Electric Industrial Co., Ltd., Osaka, Japan

[21] Appl. No.: 09/058,882

[22] Filed: Apr. 13, 1998

[30] Foreign Application Priority Data

May 21, 1997 [JP] Japan ................................. 9-146059

[51] Int. Cl.[7] ........................................................ H04Q 7/20
[52] U.S. Cl. ............................................ 455/561; 455/127
[58] Field of Search ........................... 455/561, 522, 455/67.1, 423, 127

[56] References Cited

U.S. PATENT DOCUMENTS

| | | | |
|---|---|---|---|
| 4,570,265 | 2/1986 | Thro | 455/561 |
| 5,659,892 | 8/1997 | Soleimani et al. | 455/127 |
| 5,710,981 | 1/1998 | Kim et al. | 455/127 |
| 5,809,420 | 9/1998 | Ichiyanagi et al. | 455/127 |

FOREIGN PATENT DOCUMENTS

| | | |
|---|---|---|
| 7-107033 | 4/1995 | Japan . |
| 8-18503 | 1/1996 | Japan . |
| 8-32513 | 2/1996 | Japan . |
| 8-32515 | 2/1996 | Japan . |
| 96/37972 | 11/1996 | WIPO . |

OTHER PUBLICATIONS

Copy of an English Language Abstract of JP No. 7–107033.
Copy of an English Language Abstract of JP No. 8–18503.
Copy of an English Language Abstract of JP No. 8–32513.
Copy of an English Language Abstract of JP No. 8–32515.

Primary Examiner—Daniel S. Hunter
Assistant Examiner—Myron K. Wyche
Attorney, Agent, or Firm—Greenblum & Bernstein, P.L.C.

[57] ABSTRACT

Each gain control amplifier 3 adjusts the transmission power of the transmit signals directed to each user according to the power control signal. Gaussian noise generator 4 generates Gaussian noise. Noise power control section 6 controls gain control amplifier 5 based on the power control signal to each user and total power control signal and adjusts the transmission power of the Gaussian noise so that the summation of the transmission power may be kept constant.

14 Claims, 4 Drawing Sheets

SYSTEM AND METHOD FOR WIRELESS COMMUNICATIONS

BACKGROUND OF THE INVENTION

1. Field of the Invention

The present invention relates to wireless communication systems used for car telephones and portable telephones, etc. and their methods.

2. Related Art

Wireless communication systems such as car telephones and portable telephones are based on a multiple access system in which communications are performed simultaneously between one base station and multiple users (mobile stations). Recently, the CDMA (Code Division Multiple Access) system, which allows efficient use of frequencies, is used as this multiple access system.

The transmission block of a conventional CDMA system base station (hereafter simply referred to as "base station") is described below using a block diagram in FIG. 1. As shown in FIG. 1, a conventional base station has spread modulation section 101 which spreads the transmit data to be transmitted to each user using a spread code assigned to each user, quadrature modulator 102 which quadrature-modulates the spreading transmit data, and gain control amplifier 103 which adjusts the transmission power of the quadrature-modulated transmit signals which is modulated according to a power control signal. The conventional base station also has adder circuit 104 which adds each transmit signals whose transmission power has been amplified, mixer 105 which multiplies the added transmit signals by a local frequency and modulates it into a radio frequency band, amplifier 106 which amplifies the transmission power of the transmit signals modulated into the radio frequency band by a constant amplification factor, and antenna 107 which transmits the transmit signals.

The flow of the transmit data/signals at the conventional base station is described below: Transmit data A directed to user A is spreading using a spread code assigned to user A by spread modulation section 101a and quadrature-modulated by quadrature modulator 102a. The transmission power of transmit signals A is adjusted by gain control amplifier 103a based on a power control signal. The transmit signals of other users is each spreading, quadrature-modulated and its transmission power adjusted in the like manner. Each user's transmit signals whose transmission power has been adjusted is added by adder circuit 104, modulated into a radio frequency band by mixer 105, with the transmission power amplified by amplifier 106 by a constant amplification factor, and transmitted by radio through antenna 107.

Each user receives the signals transmitted from the base station and after converting the frequency of the receive signals, inversely spreads it using an assigned spread code to extract the data transmitted from the base station directed to the mobile station. In this inverse spreading process, the transmit signals of other channels directed to other stations acts as noise. Each user indicates the base station the transmission power of the next transmit data directed to the station based on an S/I ratio which is the ratio of the transmission power of the receive data directed to the station to the transmission power of interference (noise).

At this point, when some users perform burst transmissions capable of transmitting a large volume of data, the conventional base station has the problem of transmit errors caused by an instantaneous variation of the S/I ratio, resulting in a deterioration of the quality of communications by the other users.

SUMMARY OF THE INVENTION

It is an objective of the present invention to provide a wireless communication system and its method in the case that some users perform burst transmissions, to stabilize the quality of communications with other users.

The present invention achieves the above objective by providing a wireless communication system and its method which keeps the S/I ratio constant by generating noise so that the summation of the transmission power may be kept constant, thus preventing transmit errors in burst transmissions.

DESCRIPTION OF THE PREFERRED EMBODIMENT

The actual embodiments of the present invention are detailed below with reference to figures.

(Embodiment 1)

In Embodiment 1, a wireless communication system and its method which keeps the summation of the transmission power of the transmit signals constant by controlling the transmission power of noise generated is explained.

Figure 1:
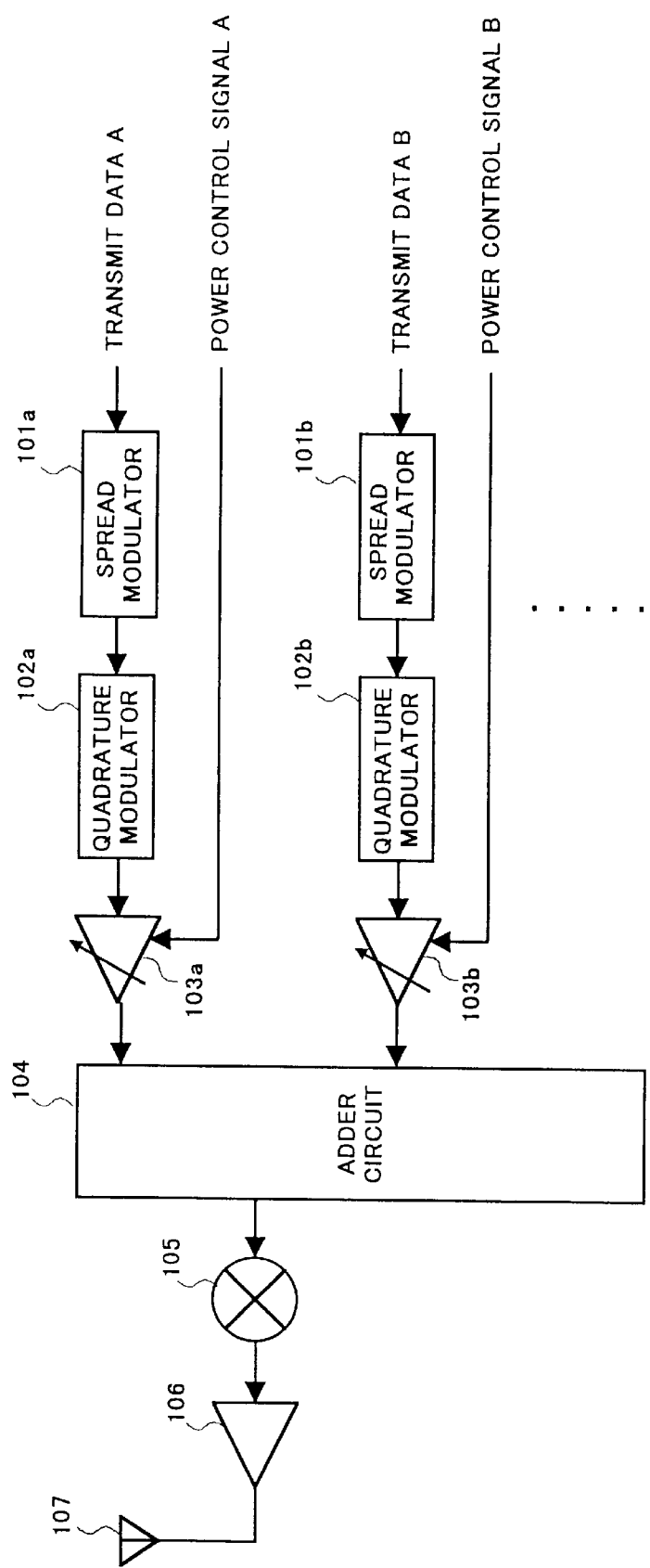
FIG. 1 is a block diagram of the transmit block of a conventional CDMA system base station.
Figure 2:
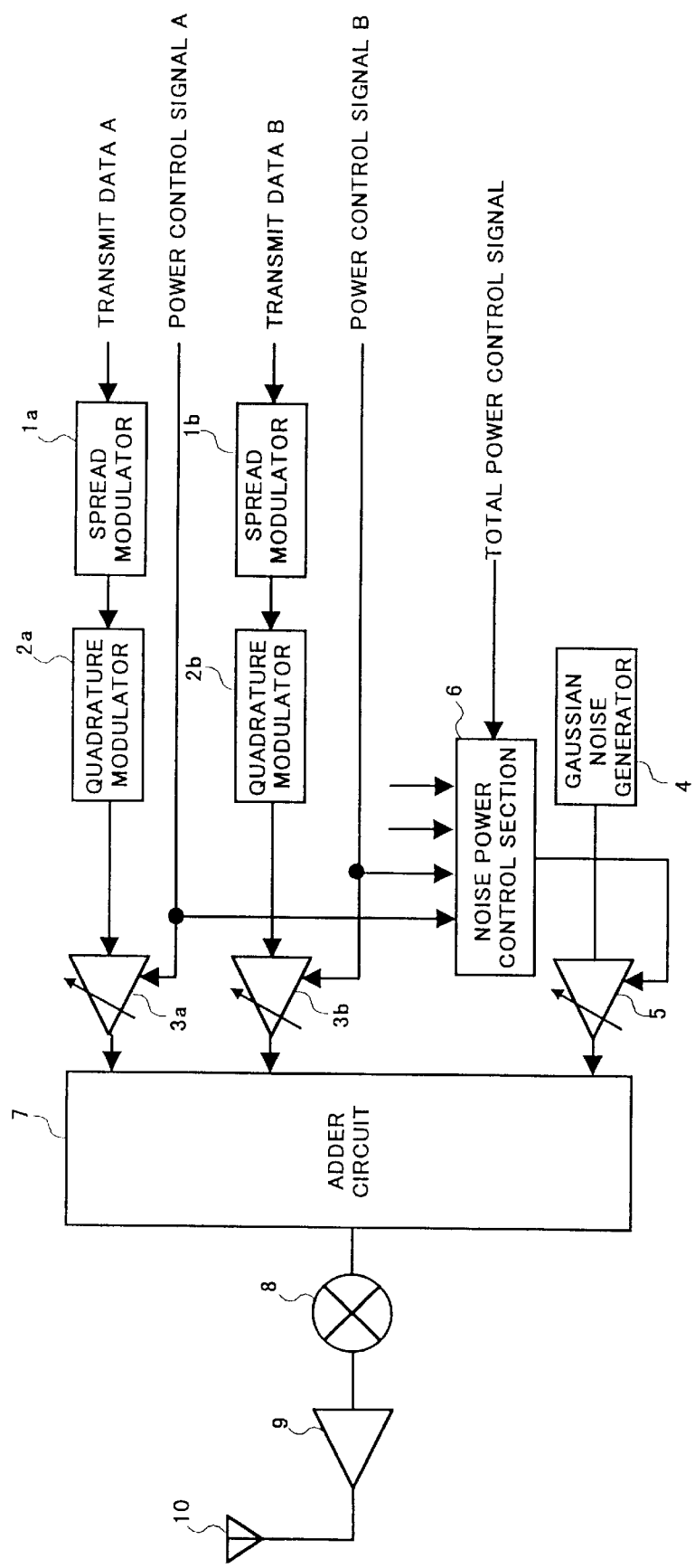
FIG. 2 is a block diagram of the transmit block of the CDMA system base station in Embodiment 1 of the present invention.

FIG. 2 is a block diagram of the transmit block of the CDMA system base station (hereafter simply referred to as "base station") in Embodiment 1. As shown in FIG. 2, the base station in Embodiment 1 has spread modulation section 1 which spreads the transmit data to be transmitted to each user using a spread code assigned to each user, quadrature modulator 2 which quadrature-modulates the spreading transmit data, and gain control amplifier 3 which adjusts the transmission power of the quadrature-modulated transmit signals according to a power control signal. Furthermore, the base station in Embodiment 1 has Gaussian noise generator 4 which generates Gaussian noise, gain control amplifier 5 which adjusts the transmission power of Gaussian noise, noise power control section 6 which controls gain control amplifier 5 based on the power control signal to each user and a total power control signal, and adder circuit 7 which adds each transmit signals whose transmission power has been amplified and the Gaussian noise generated. The transmit signals and Gaussian noise added by adder circuit 7 is hereafter referred to as "multiplex signals."

Furthermore, the base station in Embodiment 1 has mixer 8 which multiplies the multiplex signals by a local frequency and modulates it into a radio frequency band, amplifier 9 which amplifies the transmission power of the multiplex signals modulated into the radio frequency band by a constant amplification factor, and antenna 10 which transmits the multiplex signals by radio.

The flow of the transmit data at the base station of Embodiment 1 is described below:

Transmit data A directed to user A is spread using a spread code assigned to user A by spread modulation section 1a and quadrature-modulated by quadrature modulator 2a. The transmission power of transmit signals A is then adjusted by gain control amplifier 3a based on a power control signal. The transmit data directed to other users is also each spread, quadrature-modulated, and its transmission power adjusted in the like manner. Gaussian noise is generated by Gaussian noise generator 4 and the transmission power of Gaussian noise is adjusted by gain control amplifier 5 through control of noise power control section 6.

Then, each transmit signals whose transmission power has been adjusted and the Gaussian noise are added by adder circuit 7, modulated into a radio frequency band by mixer 8, with the transmission power amplified by a constant amplification factor by amplifier 9, and transmitted by radio from antenna 10.

Each user receives the signals transmitted from the base station and after converting the frequency of the receive signals, inversely spreads it using an assigned spread code to extract the signal directed to the mobile station. In this inverse spreading process, the transmit data transmitted from the base station of other channels directed to other stations acts as noise. Each user indicates the base station the transmission power of the next transmit signals directed to the station based on an S/I ratio which is the ratio of the transmission power of the receive signals directed to the station to that of interference (noise).

Figure 3:
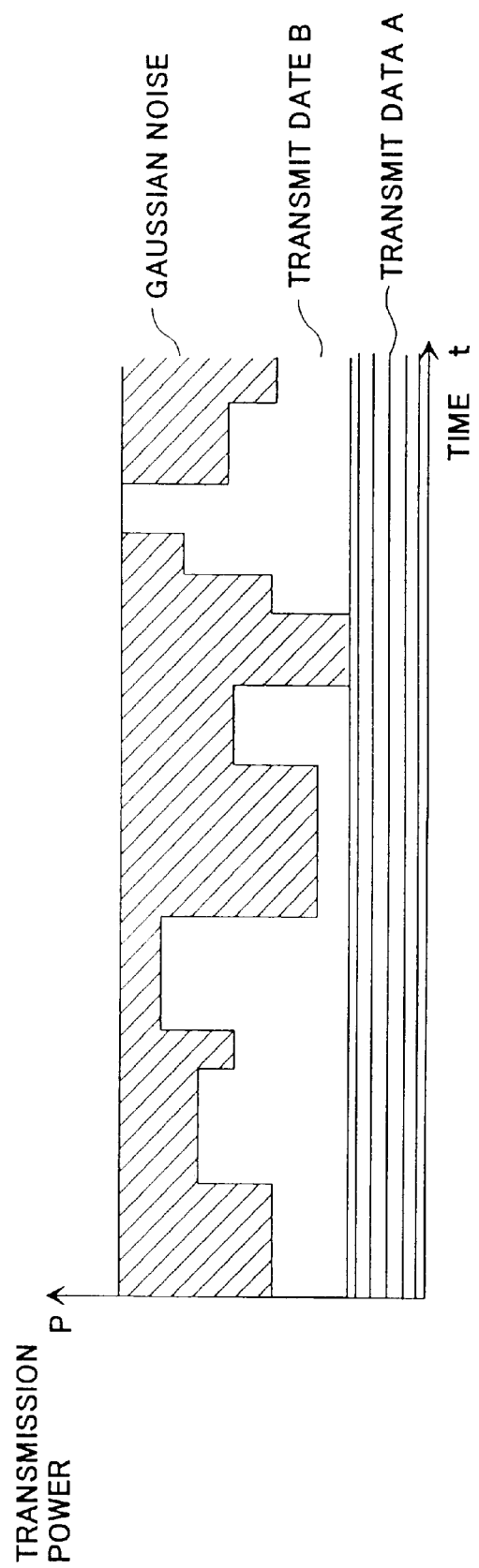
FIG. 3 is a graph showing time variations of the transmission power of the transmit data directed to each user transmitted from the CDMA system base station in Embodiment 1 of the present invention.

Then, the control performed by noise power control section 6 is explained in detail using FIG. 3. FIG. 3 is a graph showing a time variation of the transmission power of the transmit signals directed to each user transmitted from the base station in Embodiment 1. In FIG. 3, the horizontal axis represents the time and the vertical axis represents the summation of the transmission power of the base station transmit signals including Gaussian noise. In FIG. 3, two stations are communicating with the base station; user A and user B. The base station transmits to user A with a constant transmission power, while performing burst transmission whose transmission power changes drastically to user B.

Noise power control section 6 inputs a power control signal and calculates the transmission power of the Gaussian noise by subtracting the transmission power of each transmit signals being transmitted from the total power. It then controls gain control amplifier 5 based on the calculation result. That is, it adds the Gaussian noise (hatched area in the figure) to the transmission power of transmit signals B (the white area) so that the summation of the transmission power P may be kept constant with respect to time "t" in FIG. 3.

The summation of the transmission power is determined by the capacity of the base station or by the cell range of the base station in the communication system.

Thus, adding the Gaussian noise to the transmit signals to each user keeps the summation of the transmission power of the transmit signals transmitted from the base station constant, which keeps the S/I ratio of the receive signals for user A constant, resulting in stabilization of the quality of communications. Since the Gaussian noise is orthogonal to the transmit signals directed to other users, it is completely eliminated through inverse spreading on the receiving side.

(Embodiment 2)

In Embodiment 2, a wireless communication system and its method which keeps the summation of the transmission power of the transmit signals and noise constant while minimizing the transmission power of noise generated is explained below.

Figure 4:
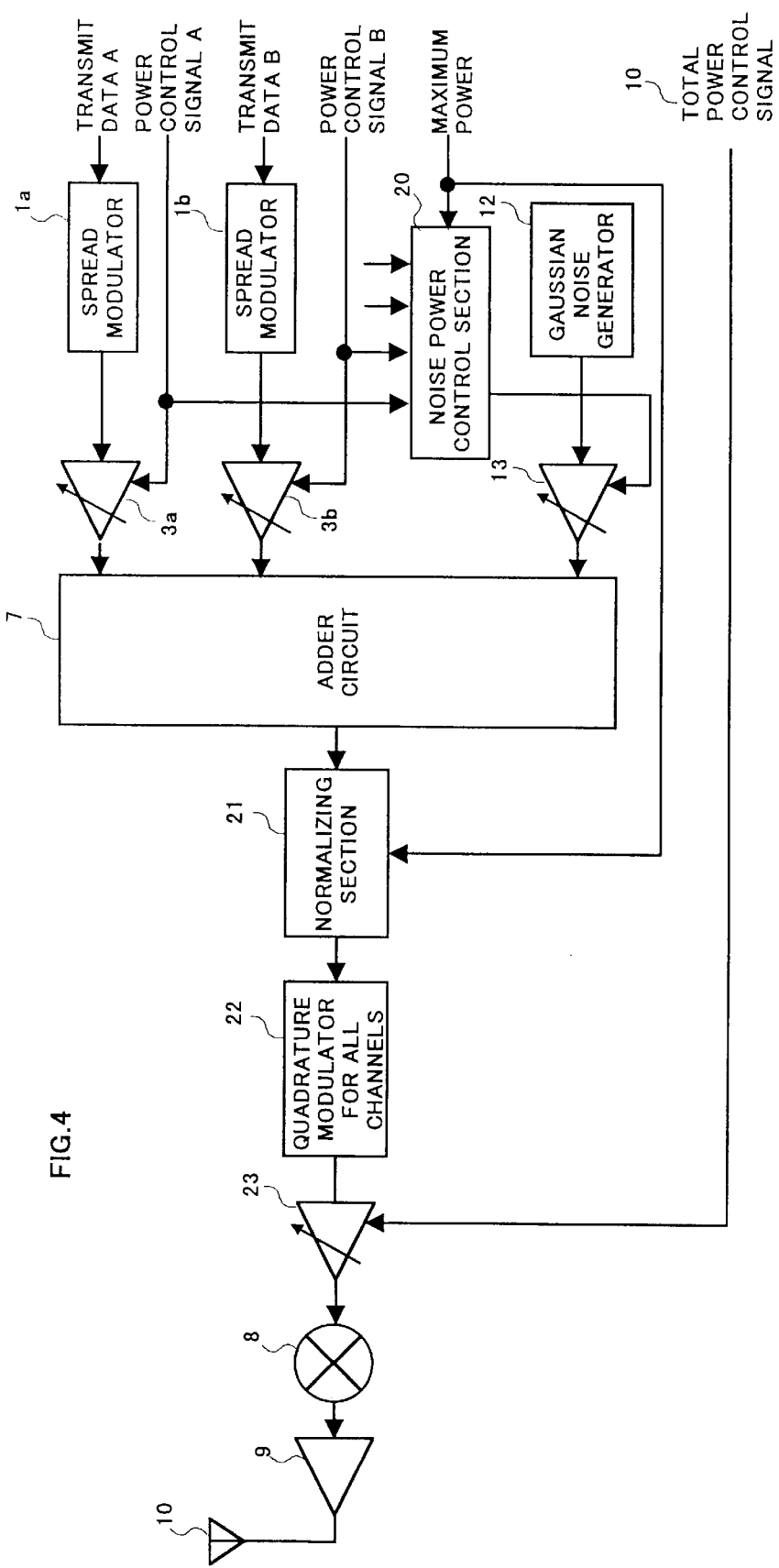
FIG. 4 is a block diagram of the transmit block of the he CDMA system base station in Embodiment 1 of the present invention.

FIG. 4 is a block diagram of the transmit block of the base station in Embodiment 2. The areas common to FIG. 2 are marked with identical signs and their explanations are omitted. In FIG. 2, noise power control section 20 inputs the power control signal to each user and the summation of the maximum power of each user channel stored in memory to date which is not illustrated in figures (hereafter referred to as "maximum power value") and calculates the transmission power of Gaussian noise by subtracting the total power of all users engaged in communication from the maximum power value. Noise power control section 20 controls gain control amplifier 6 based on the calculation result. In this case, when the current summation of the transmission power falls short of the maximum power value, the shortage is complemented by Gaussian noise, allowing the transmission power of Gaussian noise to be suppressed to the necessary minimum.

Normalizing section 21 normalized the transmission power of the multiplex signals output from adder circuit 7 to the maximum power value and outputs it to a quadrature modulator for all channels 22. The quadrature modulator for all channels 22 quadrature-modulates the normalized transmit data for all channels and outputs it to gain control amplifier 23.

Gain control amplifier 23 controls the transmission power of the transmit signals quadrature-modulated for all channels based on the total power control signal and outputs it to mixer 8. This allows the transmission power of the added signals to be kept constant even if the maximum power value changes.

The flow of the transmit date at the base station in Embodiment 2 is explained below. Transmit data A directed to user A is spread by spread modulation section 1a using a spread code assigned to user A. The transmission power of transmit signals A is adjusted by gain control amplifier 3a according to the power control signal. The transmit data directed to other users is also each spread and its transmission power adjusted in the like manner. Gaussian noise is generated from Gaussian noise generator 4 and the transmission power of the Gaussian noise is adjusted by gain control amplifier 5 through control of noise power control section 20. Each transmit signals and Gaussian noise whose transmission power has been adjusted are added by adder circuit 7 and normalized by normalizing section 21. The normalized multiplex signals is quadrature-modulated by quadrature modulator 22 for all channels, modulated into a radio frequency band by mixer 8, and after its transmission power is amplified by a constant amplification factor by amplifier 9, transmitted by radio from antenna 10.

Thus, adding the Gaussian noise to the transmit data to each user keeps the summation of the transmission power of the transmit signals transmitted from the base station constant, which keeps the S/I ratio of the receive data for user A constant stabilizing the quality of communications. Furthermore, making the transmission power of the Gaussian noise the difference between the maximum power value and the current summation of the transmission power allows the transmission power of the Gaussian noise to be suppressed to the necessary minimum.

What is claimed is:

1. A wireless communication base station apparatus, comprising:
    a noise generator that generates noise; and
    a noise power controller that controls the transmission power of said noise based on a transmission power of each user channel signal so that a sum of the transmission power of said each user channel signal and said noise is maintained constant.

2. The wireless communication base station apparatus according to claim 1, wherein said noise power controller controls the transmission power of said noise so that the sum of the transmission power of said each user channel signal and said noise is maintained equal to the total power.

3. A wireless communication base station apparatus, comprising:

a noise generator that generates noise;

a noise power controller that controls the transmission power of said noise based upon a transmission power of each user channel signal so that a sum of the transmission power of said each user channel signal and said noise is maintained constant;

an adder that adds transmit signals of said each user channel signal and said noise to generate multiplex signals;

a normalizer that normalizes said multiplex signals; and a power controller that controls the transmission power of said normalized multiplex signals.

4. The wireless communication base station system according to claim 3, wherein said noise power controller controls the transmission power of said noise so that the sum of the transmission power of said each user channel signal and said noise is maintained equal to the sum of the maximum power of each said user channel signal to date.

5. The wireless communication base station system according to claim 3, wherein said noise power controller ensures that the transmission power of the multiplex signals is maintained equal to the total power.

6. A mobile station apparatus that communicates with a wireless communication base station apparatus, comprising:

a noise generator that generates noise;

a noise power controller that controls the transmission power of said noise based on a transmission power of each user channel signal so that a sum of the transmission power of said each user channel signal and said noise is maintained constant.

7. A mobile station apparatus that communicates with a wireless communication base station apparatus, comprising:

a noise generator that generates noise;

a noise controller that controls the transmission power of said noise based on a transmission power of each user channel signal so that a sum of the transmission power of said each user channel signal and said noise is maintained constant;

an adder that adds transmit signals of said each user channel signal and said noise to generate multiplex signals;

a normalizer that normalizes said multiplex signals; and a power controller that controls the transmission power of said normalized multiplex signals.

8. A wireless communication method, comprising:

generating noise;

controlling the transmission power of the noise based on a transmission power of each user channel signal so that a sum of the transmission power of each user channel signal and the noise is maintained constant.

9. The wireless communication method according to claim 8, wherein controlling of the transmission power of the noise controls the transmission power of noise so that the sum of the transmission power of each user channel signal and the noise is maintained equal to the total power.

10. A wire less communication method, comprising:

generating noise;

controlling the transmission power of the noise based on a transmission power of each user channel signal so that a sum of the transmission power of each user channel signal and the noise is maintained constant;

generating multiplex signals by adding the transmit signals of each user channel signal and the noise;

normalizing the multiplex signals; and controlling the transmission power of the normalized multiplex signals.

11. The wireless communication method according to claim 10, wherein the controlling of the transmission power of the noise controls the transmission power of noise so that the sum of the transmission power of each user channel signal and the noise is maintained equal to the sum of the maximum power to date.

12. The wireless communication method according to claim 10, wherein controlling of the transmission power of the multiplex signals ensures that the transmission power of the multiplex signals is maintained equal to the total power.

13. The wireless communication base station apparatus according to claim 1, wherein said noise power controller calculates the transmission power of said noise by subtracting the transmission power of each transmitter user channel signal from the total power.

14. The wireless communication method according to claim 8, wherein controlling the transmission power of noise comprises calculating the transmission power of the noise by subtracting the transmission power of each transmitted user channel signal from the total power.

* * * * *